United States Patent [19]

Hugl et al.

[11] Patent Number: 5,391,641
[45] Date of Patent: Feb. 21, 1995

[54] SEGMENTED N-ALKYL POLYURETHANE AMIDES

[75] Inventors: Herbert Hugl, Bergisch Gladbach; Burkhard Köhler; Rolf Dhein, both of Krefeld, all of Germany

[73] Assignee: Bayer Aktiengesellschaft, Leverkusen, Germany

[21] Appl. No.: 106,185

[22] Filed: Aug. 12, 1993

[30] Foreign Application Priority Data

Aug. 21, 1992 [DE] Germany .............................. 4227750

[51] Int. Cl.$^6$ ..................... C08L 75/04; C08L 77/00
[52] U.S. Cl. .................................. 525/433; 525/420
[58] Field of Search ......................... 525/420, 433

[56] References Cited

U.S. PATENT DOCUMENTS

| | | | |
|---|---|---|---|
| 4,588,783 | 5/1986 | Chang | 525/329.9 |
| 4,734,462 | 3/1988 | Liedloff et al. | 525/424 |
| 4,876,317 | 10/1989 | Blackmon et al. | 525/433 |

OTHER PUBLICATIONS

Journal of Polymer Science Part A : Polymer Chemistry Ed., vol. 28, No. 13, Dec. 1990, pp. 3685–3699, Chapman et al "Polyurethane Elastomers with Hydrolytic and Thermooxidative Stability. II Polyurethanes with N-Alkylated Polyurethane Soft Blocks".

S. Gogolewski in Colloid Polymer Science No. 267, 757 to 785.

J. H. Saunders in Rubber Chem. Technol. 32, 1959 337 et seq.

H. Shintaini and A. Nakaumura in Journal of Analytica Toxicology 13, 1989, 354 to 357.

*Primary Examiner*—Ana L. Carrillo
*Attorney, Agent, or Firm*—Joseph C. Gil; Godfried R. Akorli

[57] ABSTRACT

The invention relates to segmented N-alkyl polyurethane amides having an average molecular weight of 5,000 to 250,000, to a process for their production and to their use for the production of materials which may be used in the medical field.

1 Claim, No Drawings

SEGMENTED N-ALKYL POLYURETHANE AMIDES

BACKGROUND OF THE INVENTION

1. Field of the Invention

This invention relates to segmented N-alkyl polyurethane amides, to a process for their production and to their use for the production of moldings, films and fibers, particularly for use in the medical field.

2. Brief Description of the Prior Art

Polyurethanes are often used for the production of moldings, films and fibers, particularly those intended for the medical applications. These polyurethanes are distinguished by excellent mechanical properties and by relatively favorable compatibility with the body. However, a disadvantage of the polyurethanes in question is that during thermoplastic processing at temperatures above 200° C., they are split back into the starting polyols and the isocyanates show inadequate hydrolytic stability (see, for example, S. Gogolewski in Colloid Polymer Science No. 267, 1989, 757 to 785 or J. H. Saunders in Rubber Chem. Technol. 32, 1959, 337 et seq. or H. Shintani and A. Nakamura in Journal of Analytica Toxicology 13, 1989, 354 to 357). Accordingly, there was a need to provide heat-stable and hydrolysis-stable materials for the production of moldings, films and fibers, particularly for use in the medical field, which materials, at the same time would show the desired level of mechanical properties.

It has now been found that N-alkyl polyurethane amides corresponding to formula (I) satisfy these requirements.

DESCRIPTION OF THE INVENTION

Accordingly, the present invention relates to segmented N-alkyl polyurethane amides corresponding to (I)

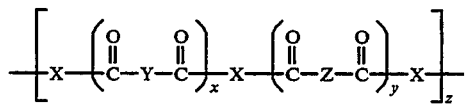

In formula (I), X represents oligoamides corresponding to formula (II)

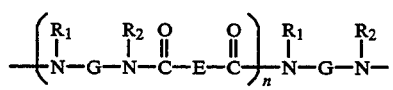

in which

E is a $C_{2-12}$ alkylene radical or a $C_{6-8}$ cycloalkylene radical, a $C_{6-14}$ arylene radical, and preferably a $C_{4-8}$ alkylene radical, G is a $C_{2-12}$ alkylene radical, $R_1$ and $R_2$ may be the same or different and represent $C_{1-12}$ alkyl radicals or are preferably members of a diazaheterocycle containing 6 or 7 ring atoms and n is a natural number from 1 to 30 and preferably 2 to 10.

Also in formula (I), Y represents diglycol units with Mn greater than 400, preferably 600 to 20,000, and Z represents diglycol units with (number average molecular weight) Mn less than 400 or units of a diphenol corresponding to formula (III)

—O—D—O— (III)

in which D is an aromatic radical, x and y have a value of 0 or 1, at least one of the two having the value 1, and z is a number which indicates that the weight average molecular weight (Mw) of the polymer as a whole assumes values of 5,000 to 250,000 and preferably 15,000 to 150,000.

The present invention also relates to a process for the production of the polymers of formula (I) according to the invention comprising:

condensing the low molecular weight polyamides of formula (V) with bis-chlorocarbonic acid esters corresponding to formula (VI) and/or (VII)

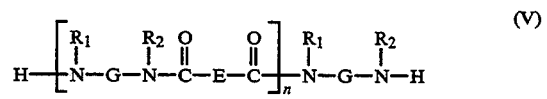

in which G, Y, Z, E, $R_1$, $R_2$ and n are as defined above. The condensation of the low molecular weight polyamides with bis-chlorocarbonic acid esters takes place in solution with addition of bases, such as sodium hydroxide, magnesium oxide, pyridine, imidazole, dimethylaminopyridine, triethyl amine or N,N-dimethyl aniline or N-ethyl piperidine, the solvents used include, for example, methylene chloride, chloroform, chlorobenzene, tetrahydrofuran, dioxane or dioxolane.

Alternately, the process comprises condensing the low molecular weight polyamides of formula (V) with low molecular weight alkyl esters corresponding to formulae (VIII) and/or (IX)

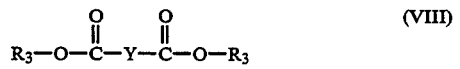

in which $R_3$ is a lower alkyl radical, such as methyl, ethyl, propyl, butyl. The melt condensation takes place by reaction of the educts at temperatures of 140° to 300° C. and under pressures of 0.001 to 5 bar.

Another process for the production of the polymers (I) according to the invention comprises condensing the low molecular weight polyamides (V) in the melt with the diglycols and phenols Y and Z in the presence of dialkyl carbonates or preferably diphenyl carbonates.

The low molecular weight polyamides corresponding to formula (V) are prepared by the melt condensation of dicarboxylic acids corresponding to formula (X)

HOOC—E—COOH (X)

and disecondary diamines corresponding to formula (XI)

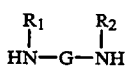

The reaction of the educts takes place at temperatures of 140° to 300° C. and under pressures of 0.001 to 5 bar, preferably in the presence of a phosphorus-containing catalyst, such as phosphorous acid, hypophosphorous acid, phosphoric acid, triaryl phosphites or phosphates, trialkyl phosphites or phosphates, phosphonates or phosphonic acids in quantities of 0.01 to 1% by weight, based on the sum of the educts, water being distilled off. Another possible method comprises condensing dicarboxylic acid halides with disecondary diamines. According to the invention, the dicarboxylic acids of formula (X) used for the production of the low molecular weight polyamides of formula (V) include, for example, adipic acid, azelaic acid, sebacic acid, suberic acid or dodecanedioic acid and also terephthalic acid, isophthalic acid, cyclohexane-1,3- and -1,4-dicarboxylic acid, naphthalene-2,6-dicarboxylic acid or 2,2-bis-(4-carboxyphenyl)-propane or the dichlorides.

Suitable disecondary diamines (XI) are, for example, piperazine, N,N-trimethyl hexamethylene diamine, N,N-dibutyl hexamethylene diamine, N,N-dimethyl propylene-1,3-diamine, N,N-dimethyl ethylene diamine, N,N-didodecyl hexamethylene diamine, N,N-diisopropyl hexamethylene diamine and bis-(4-piperidyl)-1,3-propane. The diglycol units Y may be the preferably difunctional—and optionally in small quantities (preferably up to 10%) trifunctional—polyethers, polyesters, polylactones, polydiethers, polyester amides, polycarbonates, polyacetals, vinyl polymers, for example polybutadiene diols, or even polyhydroxyl compounds already containing urethane or urea groups, optionally modified natural polyols and other Zerewitinow-active groups which are typically encountered in polyurethane chemistry, where they ave known as soft segment polyols, and which are known per se to the expert. These compounds are described in detail, for example, in DE-A 2,302,564, 2,423,764, 2,549,372, 2,402,804, 2,920,501 and 2,457 387.

Substantially difunctional hydroxyfunctional diols based on polyethylene oxide and/or polypropylene oxide and also polytetramethylene glycol ethers and corresponding mixed ethers of such components are preferred for the purposes of the invention. Hydrolysis-sensitive hydroxyfunctional polyesters, hydroxypolycarbonates or polydimethyl siloxanes terminated by hydroxyl groups are also preferred. The average molecular weight of these polyols is in the range from 550 to 20,000 and preferably in the range from 1,000 to 8,000.

Short-chain diglycol units Z are, in particular, alcohols such as ethylene glycol, butane-1,4-diol, hexane-1,6-diol, neopentyl glycol, hydroquinone-bis-2-hydroxyethyl ether, 1,4'-cyclohexane diol, diethylene glycol, 4,4'-dihydroxy-cyclohexyl methane and the diphenols corresponding to formula (III). Examples of diphenols (III) are 4,4'-dihydroxydiphenyl, 2,4'-dihydroxydiphenyl, 4,4'-dihydroxy-3,3',5,5'-tetramethyl diphenyl, 4,4'-dihydroxy-3,3'-dimethyldiphenyl, bis-(4-hydroxyphenyl)-methane, bis-(4-hydroxy-3,5-dimethylphenyl)-methane, bis-(4-hydroxyphenyl )-ethane, 2,2-bis-(4-hydroxyphenyl)-propane ("bisphenol A"), 2,2-bis-(4-hydroxyphenyl-3,5-dimethyl phenyl )-propane, 2,2-bis-(4-hydroxy-3-methylphenyl )-propane, 1,1-bis-(4-hydroxyphenyl)-cyclohexane, 1,1-bis-(4-hydroxy-3,5-dimethylphenyl)-cyclohexane, bis-(4-hydroxyphenyl )-oxide, bis-(4-hydroxy-3,5-dimethylphenyl)-oxide, bis-(4-hydroxyphenyl)-ketone, bis-(4-hydroxy-3,5-dimethylphenyl )-ketone, bis-(4-hydroxy-3,3'-diethylphenyl )-propane, 1,1-bis-(4-hydroxyphenyl)-3,3,5-trimethyl cyclohexane, bis-(4-hydroxyphenyl)-sulfone, bis-(4-hydroxy-3,3'-dimethylphenyl)-sulfone, bis-(4-hydroxyphenyl)-sulfide and bis-(4-hydroxy-3,5-dimethylphenyl)-sulfide.

2,2-Bis-(4-hydroxyphenyl)-propane and 1,1-bis-(4-hydroxyphenyl)-3,3,5-trimethyl cyclohexane are particularly preferred.

The invention is further illustrated but is not intended to be limited by the following examples in which all parts and percentages are by weight unless otherwise specified.

EXAMPLES

Example 1

(Production of a Low Molecular Weight Polyamide)

A mixture of sebacic acid and piperazine in a molar ratio of 1:2.1 is heated for 5 hours to 260° C. with 0.5% by weight triphenyl phosphite and then kept at that temperature for 18 hours. A low molecular weight polyamide having a molecular weight (Mn, determined from the amine value) of 724 is obtained.

Example 2

(Production of a Low Molecular Weight Polyamide)

The procedure is as described in Example 1 with a molar ratio of sebacic acid to piperazine of 1:1.333; a low molecular weight polyamide having a molecular weight (Mn, determined from the amine value) of 1275 is obtained.

Example 3

(Production of a Low Molecular Weight Polyamide)

The procedure is as described in Example 1 using a molar ratio of sebacic acid to piperazine of 0.875:1; a low molecular weight polyamide having a molecular weight (Mn, determined from the amine value) of 2244 is obtained.

Example 4

120 g of the bischloroformate of a polyethylene glycol ether having a molecular weight of 8,000 and 17.83 g hexanediol bischlorocarbonic acid ester are introduced into 1,000 ml methylene chloride at 20° C. A solution of 63.76 g of the low molecular weight polyamide of Example 1 and 0.2 ml N-ethyl piperidine in 250 ml methylene chloride is then added dropwise at 20° C., after which 34 g sodium hydroxide in the form of a 10% aqueous solution are added dropwise. After stirring for 1 hour, the reaction product is extracted by shaking with dilute hydrochloric acid and washed with water until neutral. An elastic product having a relative viscosity (0.5% in methylene chloride) of 1.593 is obtained.

Example 5

60 g of a bis-chlorocarbonic acid ester of a polyethylene glycol having a molecular weight of 8,000 and 59.65 g hexanediol bischlorocarbonic acid ester are dissolved in 1,000 ml methylene chloride at 20° C. A solution 180.3 g of the low molecular weight polyamide of Example 1 and 0.2 ml N-ethyl piperidine in 250 ml methylene chloride is then added dropwise at 20° C. 960 g of a 10% sodium hydroxide solution are then run in over a period of 15 minutes. After stirring for 1 hour, the product is extracted by shaking with dilute hydrochloric acid and washed with water until neutral. Removal of the methylene chloride by distillation leaves an elastic product having a relative solution viscosity (0.5% in methylene chloride) of 1.638.

Example 6

48.6 g hexanediol bischlorocarbonic acid ester are dissolved in 500 ml methylene chloride at 20° C. A solution of 216.8 g of the low molecular weight polyamide of Example 2 in 1,000 ml methylene chloride is then added dropwise over a period of 30 minutes. 80 ml of a 50% by weight sodium hydroxide solution are then run in over a period of 10 minutes. A pH value of 13 is thus established. After stirring for 1 hour at 20° C., the reaction product is extracted by shaking with dilute hydrochloric acid and washed with water until neutral. Removal of the methylene chloride by distillation leaves a product having a relative viscosity (0.5% in methylene chloride) of 1.712. The product has a melting temperature (DSC) of 141.3° C. and a maximum weight loss (TGA in air) at 473° C.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A segmented N-alkyl poly(urethane-amide) amide corresponding to (I)

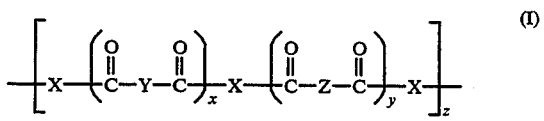

in which X represents an oligoamide corresponding to formula (II)

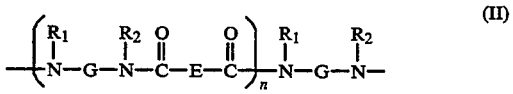

where

E is a $C_{2-12}$ alkylene radical, a $C_{6-8}$ cycloalkylene radical or a $C_{6-14}$ arylene radical, G is a $C_{2-12}$ alkylene radical, $R_1$ and $R_2$ may be the same or different and represent $C_{1-12}$ alkyl radicals or are members of a diazaheterocycle with 6 or 7 ring atoms and n is a natural number of 1 to 30, Y represents diglycol units with Mn being greater than 400, Z represents diglycol units with Mn being less than 400 or units of a diphenol corresponding to formula (III)

in which D is an aromatic radical, x and y each have a value of 0 or 1, at least one of the two having the value 1, z is a number which indicates that the Mw of the polymer as a whole assumes values of 5,000 to 250,000.

* * * * *